United States Patent
Swinkels et al.

(10) Patent No.: US 11,396,224 B2
(45) Date of Patent: Jul. 26, 2022

(54) SEALING FRAME PARTS OF AN OPEN ROOF ASSEMBLY

(71) Applicant: Inalfa Roof Systems Group B.V., Oostrum (NL)

(72) Inventors: Diederik Gijsbertus Swinkels, Sittard (NL); Wilhelmus Maria Theresia Hendrikus Schrans, Belfeld (NL); Marcel Nellen, Merselo (NL)

(73) Assignee: Inalfa Roof Systems Group B.V., Oostrum (NL)

( * ) Notice: Subject to any disclaimer, the term of this patent is extended or adjusted under 35 U.S.C. 154(b) by 18 days.

(21) Appl. No.: 16/820,169

(22) Filed: Mar. 16, 2020

(65) Prior Publication Data
US 2020/0298692 A1 Sep. 24, 2020

(30) Foreign Application Priority Data
Mar. 21, 2019 (EP) ...................... 19164287

(51) Int. Cl.
*B60J 10/90* (2016.01)
*B60J 10/248* (2016.01)
(Continued)

(52) U.S. Cl.
CPC .............. *B60J 10/90* (2016.02); *B60J 7/043* (2013.01); *B60J 10/248* (2016.02); *B62D 65/06* (2013.01); *B60J 7/022* (2013.01)

(58) Field of Classification Search
CPC ..... B60J 7/02; B60J 7/022; B60J 7/043; B60J 7/0435; B60J 10/345
(Continued)

(56) References Cited

U.S. PATENT DOCUMENTS

| 4,998,711 A | 3/1991 | Borg |
| 5,052,744 A | 10/1991 | Sugimoto |

(Continued)

FOREIGN PATENT DOCUMENTS

| DE | 3227647 A1 | 1/1984 |
| DE | 10217129 A1 | 11/2003 |

(Continued)

OTHER PUBLICATIONS

European Search Report dated Oct. 23, 2019, for corresponding European Patent Application No. 19164287.5, filed Mar. 21, 2019.

*Primary Examiner* — Dennis H Redder
(74) *Attorney, Agent, or Firm* — Steven M. Koehler; Westman, Champlin & Koehler, P A.

(57) ABSTRACT

A multi-piece frame for an open roof assembly is manufactured by providing a first frame element having an edge and a first attachment area adjacent to the edge; providing a second frame element having a second attachment area; arranging the first attachment area and the second attachment area at least partly over each other; applying a fluid sealant adjacent to the edge of the first frame element; applying a sealing element on at least one of the first frame element and the second frame element and on the sealant, while the sealant is still at least partly fluid; and curing the sealant to provide a fluid-tight sealing between the first frame element, the second frame element and the sealing element. Thus, fluid tight connection between the sealing element and the sealant is provided in a reliable manner.

20 Claims, 9 Drawing Sheets

(51) Int. Cl.
  *B62D 65/06* (2006.01)
  *B60J 7/043* (2006.01)
  *B60J 7/02* (2006.01)

(58) Field of Classification Search
  USPC .......................................... 296/216.06–216.8
  See application file for complete search history.

(56) References Cited

U.S. PATENT DOCUMENTS

| | | |
|---|---|---|
| 5,704,117 A | 1/1998 | Mok et al. |
| 6,279,989 B1 | 8/2001 | Marchart et al. |
| 7,144,076 B2 | 12/2006 | Wendler et al. |
| 8,088,319 B2 * | 1/2012 | De Winter ............... B29C 41/20 264/252 |
| 9,308,804 B2 * | 4/2016 | Roeder ................... B60J 10/16 |
| 9,340,096 B2 | 5/2016 | Bojanowski |
| 9,849,928 B2 | 12/2017 | Dayoub et al. |
| 9,925,698 B2 | 3/2018 | Van Dyck |
| 11,198,351 B2 * | 12/2021 | Matsumura ............. B29C 65/48 |
| 2015/0123430 A1 | 5/2015 | Bojanowski |
| 2016/0031124 A1 | 2/2016 | Van Dyck |
| 2016/0137243 A1 | 5/2016 | Dayoub et al. |

FOREIGN PATENT DOCUMENTS

| | | |
|---|---|---|
| DE | 102007057999 B3 | 6/2009 |
| DE | 102014115905 A1 | 5/2016 |
| DE | 102017106751 B3 | 5/2018 |
| EP | 1036684 A2 | 9/2000 |
| EP | 2799201 A1 | 11/2014 |
| EP | 3020587 A2 | 5/2016 |
| JP | 60245540 A | 12/1985 |
| JP | 2005280529 A | 10/2005 |

* cited by examiner

SEALING FRAME PARTS OF AN OPEN ROOF ASSEMBLY

BACKGROUND

The discussion below is merely provided for general background information and is not intended to be used as an aid in determining the scope of the claimed subject matter.

Aspects of the invention relate to a frame of an open roof assembly and in particular to a method of providing such a frame.

Open roof assemblies are well known in the art. The known open roof assemblies are arranged on a roof of a vehicle, wherein an opening is provided in the roof. A moveable closure member is selectively in an open position or in a closed position. In the open position, an interior of the vehicle is in open contact with an exterior of the vehicle, e.g. for providing fresh air in the interior. In the closed position, the interior of the vehicle is closed and protected against rain and other external influences, for example. In the known open roof assembly, the closure member may be (semi-)transparent to allow sunlight to enter the interior, when the closure member is in the closed position.

The closure member is arranged on a frame. It is known to provide a monolithic frame or a multi-piece frame. In the multi-piece frame at least two frame elements are arranged next or partly on top of each other. Still as part of the roof, the frame may be partly subject to water, like rain water, and therefore a fluid tight attachment may be required, at least at some positions. Further, when the moveable closure member is in the closed position, a seal needs to be present between the frame and the closure member to seal the opening in the roof of the vehicle. Such a seal may be formed by a suitable sealing element arranged around the opening. The sealing element however may cross a transition between a first frame element and a second frame element. Providing a watertight sealing at such a crossing of the sealing element and the transition between the frame elements has proven to be challenging.

In some assemblies, a sealant is provided in an interstice between two frame elements. The sealant is cured with a flat surface, wherein the flat surface is flush with surfaces of the frame elements. Thus, a sealing element may be arranged over the flat and flush surfaces such that a fluid-tight seal is provided.

In practice, it may still be challenging to provide a sufficiently flat and flush surface at the transition, in particular in mass-production manufacturing. Moreover, it may be desirable to provide an uneven transition between the first and the second frame element, in which case it may be virtually impossible to provide such a surface that the sealing element may be fluid-tightly arranged over the transition.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In an aspect, an improved method of applying a sealing element over a transition between two frame elements in a fluid-tight manner comprises: providing a first frame element having an edge and a first attachment area adjacent to the edge; providing a second frame element having a second attachment area; arranging the first attachment area and the second attachment area at least partly over each other; applying a fluid sealant adjacent to the edge of the first frame element; applying a sealing element on the first frame element and the second frame element, wherein the sealing element is applied over the sealant, while the sealant is still at least partly fluid; and curing the sealant to provide a fluid-tight sealing between the first frame element and the second frame element.

In the method, the sealant is in a fluid state when the sealing element is arranged over the sealant. The sealing element may thus be arranged and positioned, while a shape of the fluid sealant adapts to the position of the sealing element. After the sealing element is arranged and positioned, the sealant cures to form a sealing in a shape corresponding to the position of the sealing element ensuring fluid-tightness.

In an embodiment of the method, arranging the first attachment area and the second attachment area comprises attaching the first frame element and the second frame element. The first and the second frame element are attached to each other by other means than the sealant such that the sealant is not used for providing structural strength, but only for providing a fluid-tight connection. For example, in the first and the second attachment area, the frame elements may be mechanically coupled by a layer of adhesive (glue) or a tape. Other suitable attachment methods are welding, spot-welding, clinching, riveting and screwing. Of course any other suitable method may be apparent to those skilled in the art. Such other attachment methods may be applied equally well depending on the specific requirements of the particular application.

In an embodiment of the method, the edge of the first frame element, a surface of the second frame element and the sealing element enclose a volume. In this embodiment, the step d) comprises applying an amount of fluid sealant at the location of said volume, wherein the amount of fluid sealant exceeds said volume. Thus, more sealant than needed for filling said volume is provided. Accordingly, when the sealing element is arranged over the sealant and the sealant is positioned, the excess amount of sealant may be pushed aside from under the sealing element. Thus, sufficient sealant to completely fill the volume is present, while the excess amount may easily be pushed aside as the sealant is still fluid.

In an embodiment, applying the fluid sealant adjacent to the edge of the first frame element further comprises applying the fluid sealant along at least a larger part of the edge of the first frame. In a particular embodiment, the sealant is applied along the edge of the first frame element all along the attachment area and in particular along a part of the edge that is arranged over the second frame element.

In an embodiment of the method, applying the sealing element on the first frame element and the second frame element, wherein the sealing element is applied over the sealant, while the sealant is still at least partly fluid comprises arranging the sealing element on at least one of the first frame element and the second frame element and on the fluid sealant and then applying pressure on the sealing element. The sealing element may be adhered using a glue, adhesive or tape and may thus be positioned and then pressure may be applied to ensure the adherence to the surface. The same pressure may be applied at the location where the sealing element is arranged over the sealant such that, for example, an excess amount of sealant may be pushed aside as above described and/or a good adherence between sealant and sealing element is established. For example, this may comprise rolling a roller over the sealing element. Such a roller may be a flat roller or may be a textured or structured roller. In a particular embodiment, the roller may be profiled in a direction perpendicular to its rolling direction. For example, a recessed portion may be provided in the roller for accommodating the sealing element and preventing sealant to adhere to a side face of the sealing element, when the roller passes over the sealant. In a particular embodiment, for example, the sealing element comprises a base part extending in a base plane and a main sealing part extending in a direction perpendicular to the base plane, the base part comprising a first surface and a second surface opposite to the first surface and adjacent to the main sealing part, wherein in applying the sealing element on the first frame element and the second frame element, the first surface of the base part is arranged on the sealant and a surface of the roller rolls over the second surface of the base part to push the first surface of the base part on the sealant. In this particular embodiment, the roller does not need to come into contact with the sealant such that the roller may remain clean. This prevents pollution by remnants of the sealant sticking to the roller.

During application of the pressure the fluid sealant below the sealing element may be pushed sideways. A volume between the edge of the first frame element, a surface of the second frame element and the sealing element may thus be completely filled with fluid sealant.

In an embodiment, curing the sealant to provide the fluid-tight sealing between the first frame element and the second frame element comprises stimulating the curing of the sealant. For example, the step of stimulating comprises at least one of heating, applying radiation, blowing and applying a curing agent. While the sealant needs to remain in a liquid phase between the manufacturing steps of application of the sealant and the application of the sealing element, it may be preferred to have the sealant cure as fast as possible after the sealing element has been applied. In an embodiment, the sealant may cure, or at least harden, over time without any specific actions. To reduce a curing period, a specific sealant may be selected with a corresponding curing means such that the curing may be stimulated. Known methods of curing certain compositions are heating, applying radiation, e.g. ultraviolet (UV) radiation, blowing or applying a curing agent. Any other method or means may be used depending on the sealant used. The present invention is not limited in this respect.

In an embodiment of the method, applying the fluid sealant adjacent to the edge of the first frame element comprises applying a fluid first sealant adjacent to the edge of the first frame element; curing the first sealant; applying a fluid second sealant on the cured first sealant. In this embodiment, the sealing element is applied, while the second sealant is still at least partly fluid and, after application of the sealing element, the second sealant is cured.

In a further embodiment, the fluid second sealant is applied on the cured first sealant and on at least one of the first frame part and the second frame part. Thus, the second sealant may extend beyond boundaries of the first sealant and the above-mentioned volume. The second sealant between a frame part and the sealing element is then pressed to form a very thin layer and a gradual transition to a direct contact between sealing element and frame part for providing a fluid tight sealing.

In an aspect, the present invention provides an open roof assembly for a roof of a vehicle. The open roof assembly comprises a frame defining an opening in the roof of the vehicle and a closure member. The closure member is moveable from a closed position, in which the opening is closed, to an open position. The frame comprises a first frame element, a second frame element and a sealing element, wherein the frame is formed in accordance with the aforementioned method. In particular, the first frame element has an edge and a first attachment area adjacent to the edge; the second frame element has a second attachment area; the first attachment area and the second attachment area are at least partly arranged over each other; a cured sealant is adjacent to the edge of the first frame element; and a sealing element is arranged on the cured sealant and at least one of the first frame element and the second frame element, wherein the sealing element has been applied over the sealant, while the sealant was still at least partly fluid.

In an embodiment of the open roof assembly, the sealant is bulged near an edge of the sealing element. By applying pressure to the sealing element during application of the sealing element, the fluid sealant will move sideways from under the sealing element. The excess amount of sealant may bulge near the edges and remain bulged after curing. The location of the bulge depends on multiple factors, such as the excess amount of sealant, the pressure applied, a shape of the pressure applying element, physical properties of the sealant like viscosity, surface tension, and possibly other factors. During designing and engineering, the bulging may be taken into account such to provide for space for such bulging.

In an embodiment, an interstice is formed along the edge of the first frame element and the sealant is provided in the interstice, wherein the sealant extends outside the interstice. In other words, more sealant is applied than a volume in the interstice. Thus, when the sealing element is arranged over the sealant, the sealant may be pressed and pushed sideways.

In an embodiment of the open roof assembly, the sealing element comprises a base part in a base plane and a main sealing part extending in a direction perpendicular to the base plane, the base part comprising a first surface and a second surface opposite to the first surface, wherein the first surface of the base part is arranged on the cured sealant and the second surface is adjacent to the main sealing part.

In an embodiment of the open roof assembly, the cured sealant comprises a cured first sealant and a cured second sealant in accordance with the above-described embodiment of the method.

In an embodiment of the open roof assembly, the closure member is, in the closed position, in direct mechanical contact with the sealing element for closing the opening in the roof. The sealing element thus closes a gap between the frame and the closure member, preventing water or air to flow into the interior of the vehicle.

BRIEF DESCRIPTION OF THE DRAWINGS

Further scope of applicability of aspects of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings, in which.

DETAILED DESCRIPTION OF THE ILLUSTRATIVE EMBODIMENTS

Figure 1A:
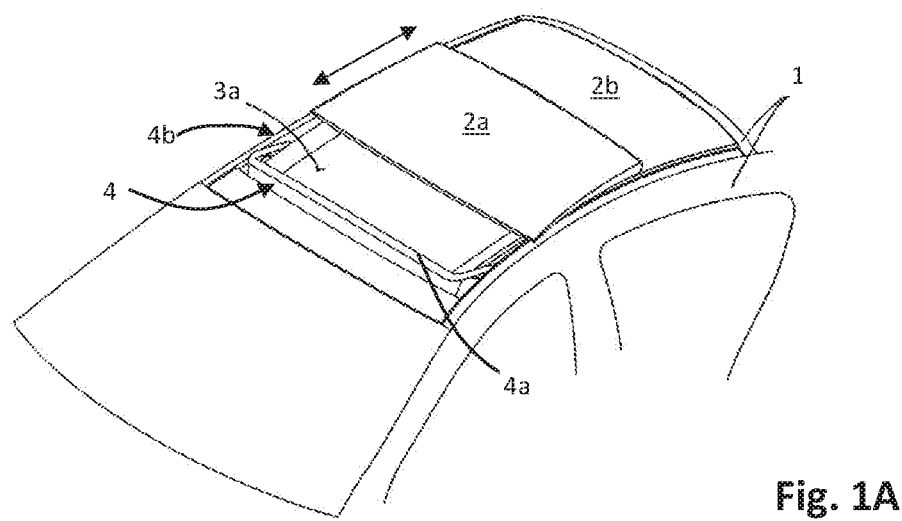
FIG. 1A shows a perspective view of a vehicle roof with an open roof assembly.

Aspects of the present invention will now be described with reference to the accompanying drawings, wherein the same reference numerals have been used to identify the same or similar elements throughout the several views.

FIG. 1 illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
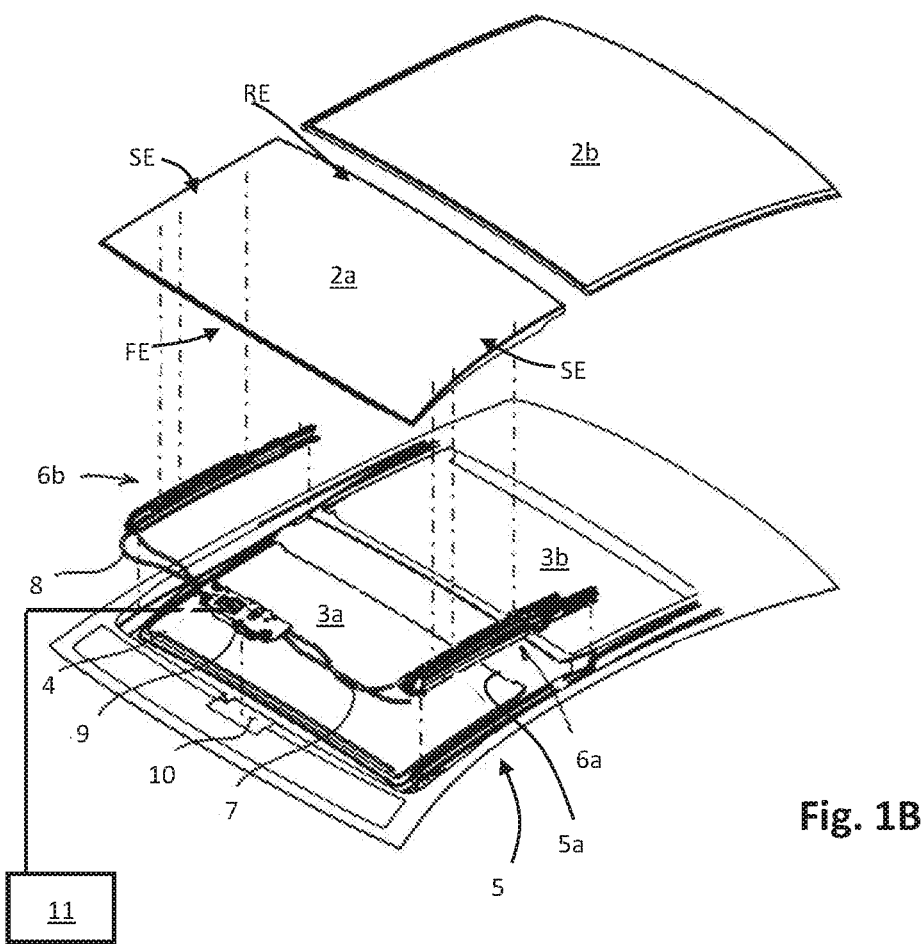
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a drive motor 9.

The drive cables 7, 8 couple the drive motor 9 to the mechanisms of the respective guide assemblies 6a, 6b such that upon operating the drive motor 9, the mechanisms start to move. In particular, a core of the drive cable 7, 8 is moved by the drive motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, a drive motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the drive motor 9 is mounted near or below the front end FE of the moveable panel 2a at a recess 10. In another embodiment, the drive motor 9 may be positioned at any other suitable position or location. For example, the drive motor 9 may be arranged near or below the rear end RE of the moveable panel 2a or below the fixed panel 2b.

A control unit 11 is schematically illustrated and is operatively coupled to the drive motor 9. The control unit 11 may be any kind of processing unit, either a software controlled processing unit or a dedicated processing unit, like an ASIC, as well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the drive motor 9 and thus the moveable roof assembly.

Figure 2A:
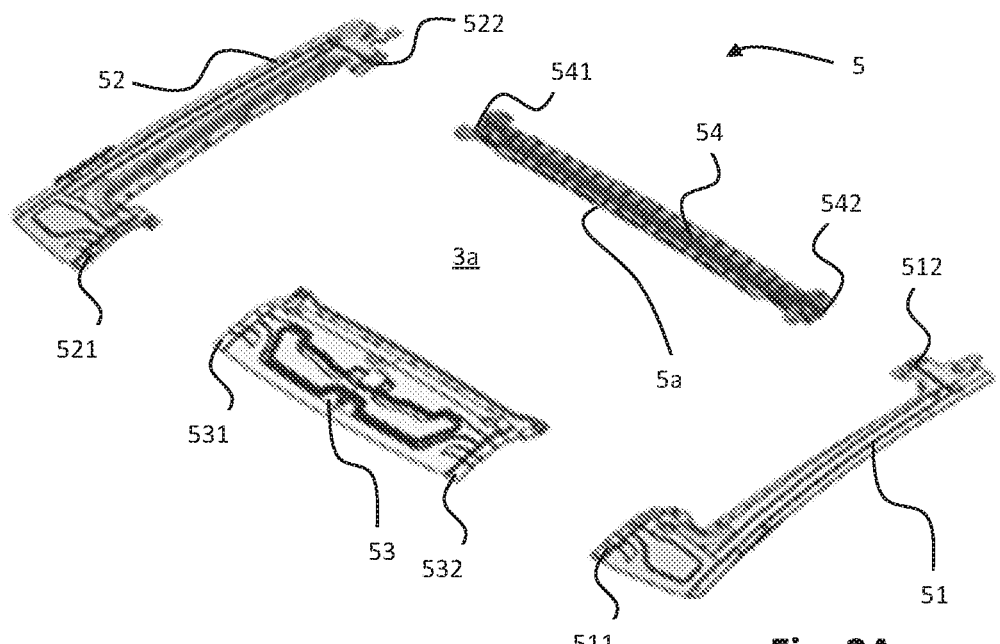
FIG. 2A shows a perspective view of a multi-piece frame for an open roof assembly according to FIGS. 1A and 1B.

FIG. 2A shows an exploded view of an exemplary embodiment of a frame 5 in more detail. In particular, the shown embodiment is a multi-piece frame comprising four frame parts: a left side beam 51, a right side beam 52, a front beam 53 and a rear beam 54. In the embodiment of the open roof assembly according to FIGS. 1A and 1B, the multi-piece frame 5 may comprise more or other frame parts. The present invention is not limited to any specific shape or form of the frame 5. Similarly, the terms used for the four frame parts 51-54 is not intended to be limiting.

Each of the frame parts 51-54 have two attachments areas. In particular, the left side beam 51 comprises a front attachment area 511 and a rear attachment area 512; the right side beam 52 comprises a front attachment area 521 and a rear attachment area 522; the front beam 53 comprises a right attachment area 531 and a left attachment area 532; and the rear beam 54 comprises a right attachment area 541 and a left attachment area 542. When assembled, the four frame parts 51-54 enclose the roof opening 3a, which is defined by the inner edge of the frame parts 51-54.

In order to form the frame 5, the four frame parts 51-54 need to be assembled such that no fluids like rain can enter the interior of the vehicle, e.g. through the opening 3a. Therefore, a seal like a rubber sealing element is usually arranged on the frame 5 and around the opening 3a. Evidently, the sealing element crosses the attachment areas of the respective frame parts 51-54. In particular at transitions from one frame part to another, the sealing may be challenging as is explained with reference to FIG. 2B.

Figure 2B:
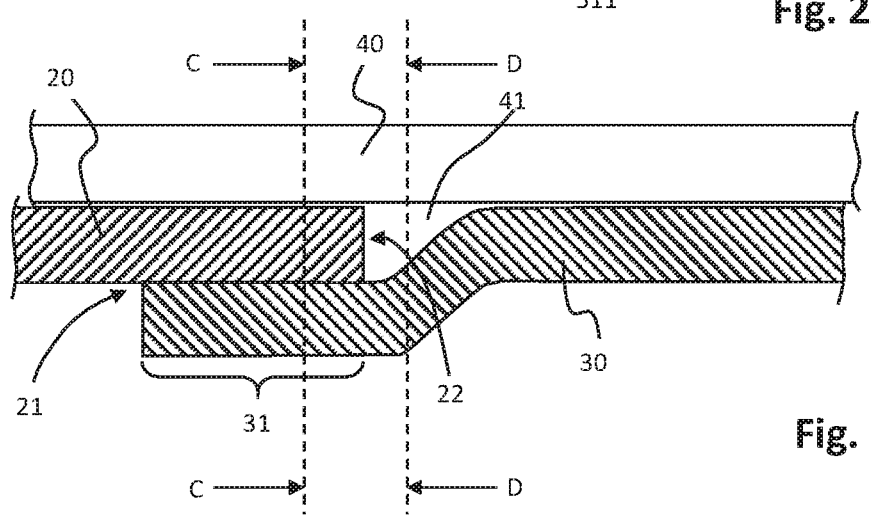
FIG. 2B shows a cross-sectional view of an attachment of two frame parts of the frame of FIG. 2A.

FIG. 2B shows a cross-section of a first frame part 20 and a second frame part 30. The first frame part 20 and the second frame part 30 may be either one of the four frame parts 51-54 shown in FIG. 2A. The first frame part 20 has a first attachment area 21 and the second frame part 30 has a second attachment area 31. The first and the second attachment areas 21, 31 are arranged over each other and may be mechanically coupled in any suitable way as will be described hereinafter.

At the transition from the first frame part 20 to the second frame part 30, a local height difference results. In the illustrated embodiment, the second attachment area 31 has been formed such that an upper surfaces of the first frame part 20 and the second frame part 30 are substantially flush. A sealing element 40 like an elongated rubber sealing element is arranged over the first frame part 20 and over the second frame part 30. Due to the form of the attachment area 31, an open volume 41 remains and is enclosed by a surface of the second frame part 30, an edge 22 of the first frame part 20 and the sealing element 40.

Figures 2C, 2D:
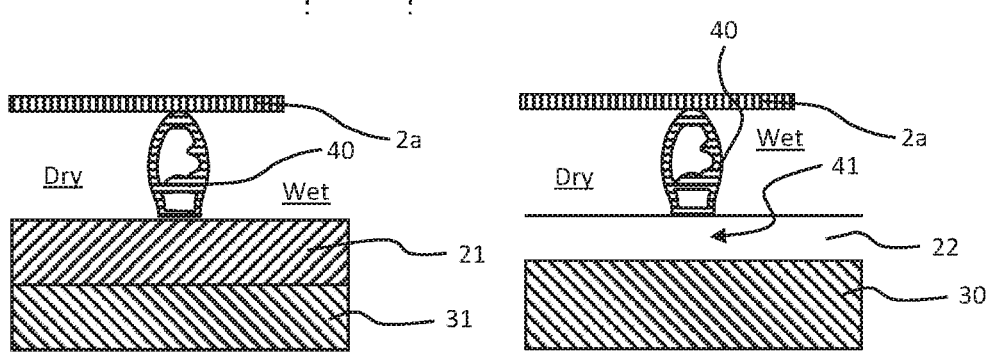
FIG. 2C shows a cross-sectional view along line C-C of FIG. 2B.
FIG. 2D shows a cross-sectional view along line D-D of FIG. 2B.

FIG. 2C shows a cross-section along line C-C (FIG. 2B). The first attachment area 21 and the second attachment area 31 are arranged over each other and on the upper surface of the first frame part 20, the sealing element 40 is arranged. The sealing element 40 is, as an example, illustrated as an elongated, hollow structure as known in the art, which is deformable under pressure. As shown in FIG. 2C, the closure member 2a is arranged on the sealing element 40, when the closure member is in the closed position. The closure member 2a may slightly deform the sealing member 40 to provide a sufficiently fluid-tight connection. At an interior side of the sealing element 40, a dry area is formed, while at an exterior side of the sealing element 40 a wet area is formed, where water and fluids may be present. The arrangement of first frame part 20, second frame part 30 and the sealing element 40 ensure that a fluid cannot flow from the wet area to the dry area.

As shown in FIG. 2D, which is a cross-section along line D-D (FIG. 2B), at the location of the volume 41, an open channel from the wet area to the dry area remains. In order to prevent a fluid to flow from the wet area to the dry area, at least the volume 41 needs to be closed, e.g. by filling the volume 41 with a sealant.

FIGS. 3A-3E illustrate a method for ensuring a fluid tight filling of the volume 41 with a sealant, wherein the method is particularly suitable to be applied in mass-production manufacturing.

Figure 3A:
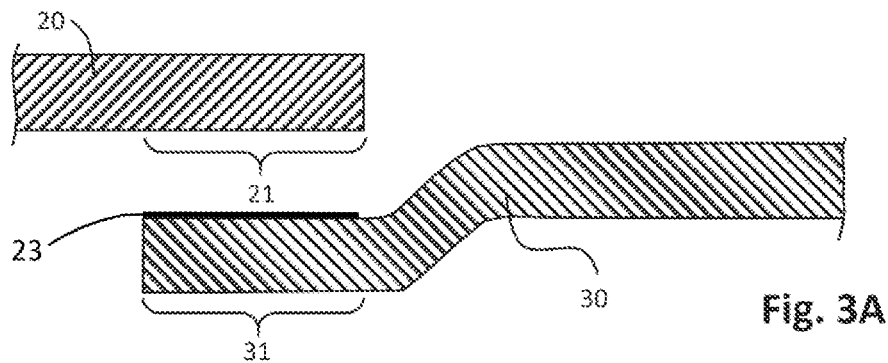
FIGS. 3A-3D show cross-sectional views of two frame parts illustrating a method of providing a first embodiment of a frame in accordance with the present invention.

In a first method step as shown in FIG. 3A, the first frame part 20 and the second frame part 30 are provided. The first frame part 20 and the second frame part 30 are arranged such that the first attachment area 21 and the second attachment area 31 are arranged over each other. Then, the first and second frame parts 20, 30 may be attached to each other by any suitable method such as welding, spot-welding, riveting, clinching and the like. Still, to prevent corrosion, it may be preferred to first treat the respective frame parts 20, 30 against corrosion, e.g. by coating or by any other suitable method. Then, the respective frame parts 20, 30 may be attached with a method wherein the treatment of the frame parts 20, 30 is not negatively affected. Therefore, for example, it may be preferred to apply an adhesive or an adhesive tape 23, or the like, to attach the respective frame parts 20, 30. The method of attachment may be selected based on such a consideration of not affecting a pre-treatment of the frame parts, but other considerations may be taken into account as well. For example, if a fluid tight attachment is preferred, a particular tape or adhesive or welding may be selected. In any case, the present invention is not limited to the method of attachment. Moreover, in the present invention, it is not required that the first and second frame parts are actually mechanically attached.

Figure 3B:
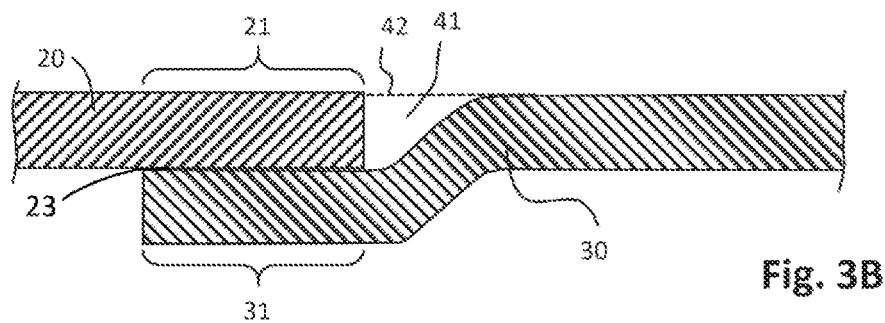

FIG. 3B illustrates a state in which the first and second frame parts 20, 30 are arranged relatively to each other and the volume 41 is formed by an elongated interstice. A dotted line 42 indicates a sealing level where an underside of the sealing element will be arranged in a later step.

Figure 3C:
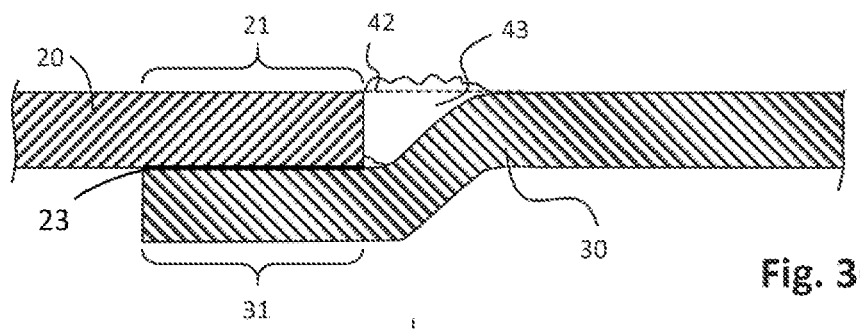

In a second step as shown in FIG. 3C, the volume 41 is filled with a fluid sealant 43 to a level above the sealing level 42, thus providing an excess amount of sealant. As apparent, the viscosity of the fluid sealant 43 needs to be high enough to prevent that the excess amount of sealant 43, i.e. the part of the fluid sealant 43 above the sealing level 42, flows over the surface of the first frame part 20 and/or the second frame part 30. Of course, as apparent to those skilled in the art, the edge 22 and the surface of the second frame part 30 in the interstice may have been pre-treated for improving interaction with the fluid sealant 43. For example, a priming fluid may be applied to improve adherence or flow behaviour prior to applying the fluid sealant 43. Further, the method of application of the fluid sealant 43 is not limited. The fluid sealant 43 may be applied by manual operation or by automated operation. An amount of pressure applied may be suitably selected by a skilled person such that the volume 41 is sufficiently filled with the fluid sealant 43 for providing a fluid tight connection.

Figure 3D:
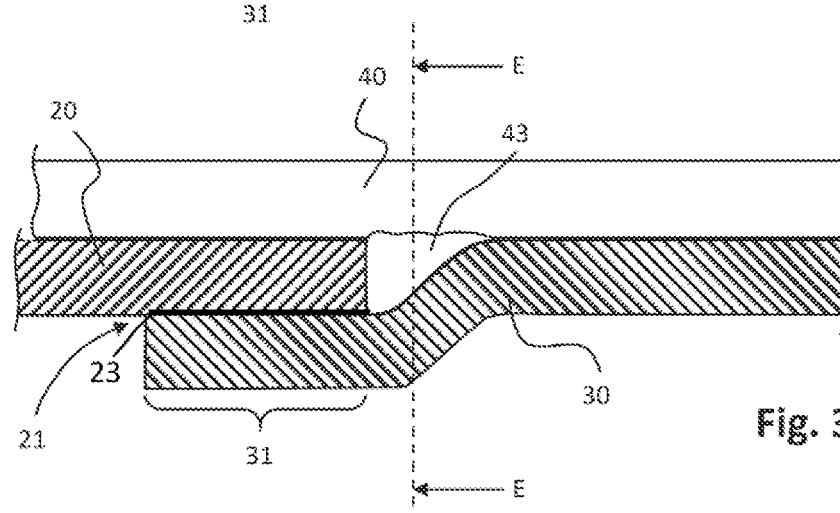

In a third step as shown in FIG. 3D, the sealing element 40 is provided over the first frame part 20, the fluid sealant 43 and the second frame part 30. The sealing element 40 is arranged and positioned on the fluid sealant 43 such that the fluid sealant 43 is flattened directly below the sealing element 40, thereby providing a fluid tight connection to the underside of the sealing element 40. Further, a pressure may be exerted on the sealing element 40 such that the fluid sealant 43 may be pressed into the volume 41, ensuring a complete filling of the volume 41 with fluid sealant 43.

After the third step of applying the sealing element 40, a fourth step is performed of hardening or curing the sealant 43 to provide a permanent fluid-tight connection. The sealant 43 may harden by drying over time, but the hardening/curing may be promoted or stimulated as well. In particular in mass manufacturing, a short curing time may be preferred. The method of curing/hardening is not limited and may be suitably selected by a person skilled in the art, e.g. depending on the composition of the selected sealant. For example, the sealant 43 may be cured/hardened by blowing, heating, application of radiation like UV radiation for photopolymerization, or application of a curing agent.

Figure 3E:
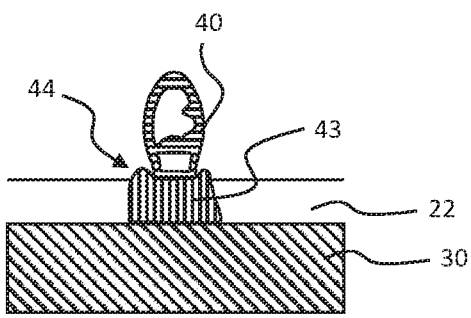
FIG. 3E shows a cross-sectional view along line E-E of FIG. 3D.

In FIG. 3E, a cross-section along line E-E (FIG. 3D) is shown. As shown, in this embodiment, the fluid sealant 43 is only locally applied below the sealing element 40. The fluid sealant 43 has been pushed by application of the sealing element 40 such that some bulges 44 result near sides of the sealing element 40. Moreover, if the excess amount of sealant 43 would be larger, some fluid sealant 43 may adhere to the side of the sealing element 40, when the sealing element 40 deforms under the applied pressure during application. Depending on the sealant composition and properties, such sealant material adhered to the side of the sealing element 40 may or may not affect the deformability of the sealing element 40. If the sealant on the side would negatively affect the function of the sealing element 40, it may be considered to apply less fluid sealant 43 or perform the application of the sealing element 40 in such a way as to prevent contact between the sealing element 40 and the fluid sealant 43.

Figure 4A:
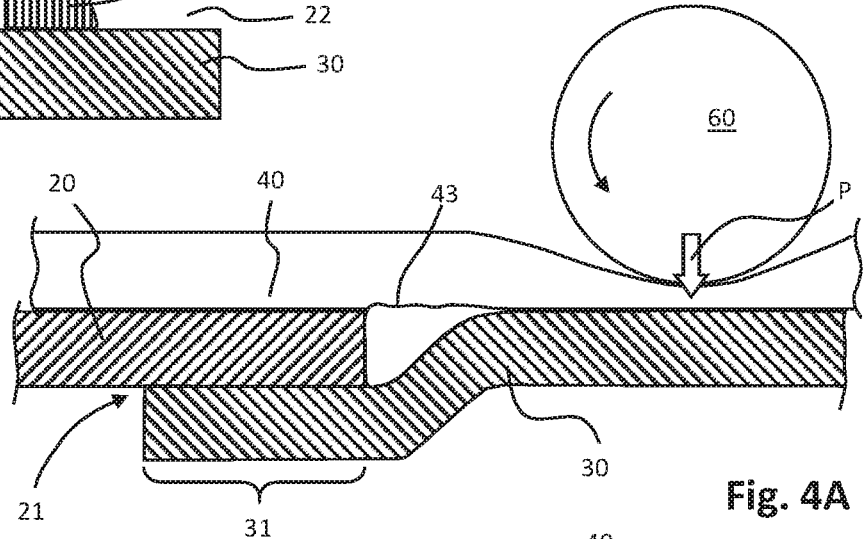
FIG. 4A shows a first embodiment of a method step of the method herein disclosed.

An exemplary embodiment of applying suitable pressure P for applying the sealing element 40 is illustrated in FIG. 4A. In this method step, a roller 60 is rolled over the sealing element 40. The sealing element 40 may be adhered to the surface of the first and second frame parts 20, 30 by an adhesive tape, for example. Applying pressure P by a roller 60 may be beneficial to ensure that the sealing element 40 is adhered sufficiently to the surface to provide for a fluid tight connection. Further, the roller 60 may be applied to push the fluid sealant 43 into the volume 41 and to push an excess amount of fluid sealant 43 sideways such that a flush surface is provided and, more importantly, a fluid-tight crossing of the sealing element 40 over the sealant 43 results.

It is noted that a diameter of the roller 60 may be suitably selected by a person skilled in the art. The diameter of the roller 60 may, for example, be selected in dependence of a dimension of the interstice 41, wherein the diameter may be selected such that the roller 60 does not deform the sealing element 40 too much at the location of the sealant 43 in the interstice.

Figure 4B:
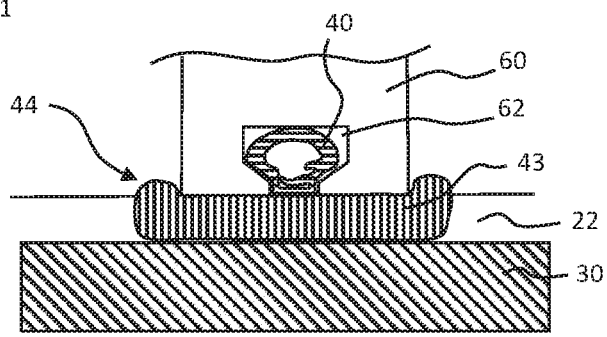
FIG. 4B shows a second embodiment of a method step of the method herein disclosed.

FIG. 4B shows a further, particular embodiment, in which a recess 62 is provided in the roller 60. During use, the sealing element 40 is arranged in the recess 62. In this embodiment, the outer surface of the roller 60 may roll over the surface of the frame parts 20, 30, while the sealing element 40 deforms in a predefined way and receives a correspondingly predefined pressure. Further, with a suitably selected cross-section of the recess 62, e.g. the cross-section shown in FIG. 4B, sides of the sealing element 40 may be held in the recess 62, while the pressure P is applied. Thus, the sides of the sealing element 40 may be protected against contact with the fluid sealant 43. As above described, this may be advantageous for ensuring the function of the sealing element 40.

It is noted that a dimension of an opening of the recess 62 in the outer surface of the roller 60 is preferably selected to be not smaller than a width of the sealing element 40 such that the sealing element 40 can easily enter and leave the recess 62 during rolling of the roller 60 and only deforms inside the recess 62.

Further, as shown in FIG. 4B, the liquid sealant 43 may be applied in a larger part of the interstice 41 along the edge 22, e.g. for supporting the roller 60. Similar to the embodiment of FIG. 3E, a bulge 44 may be formed near the sides of the sealing element 40, although the bulge 44 is, in this embodiment, formed farther away from the side of the sealing element 40 compared to the embodiment of FIG. 3E, since the bulge 44 is formed at a side edge of the roller 60.

Figure 4C:
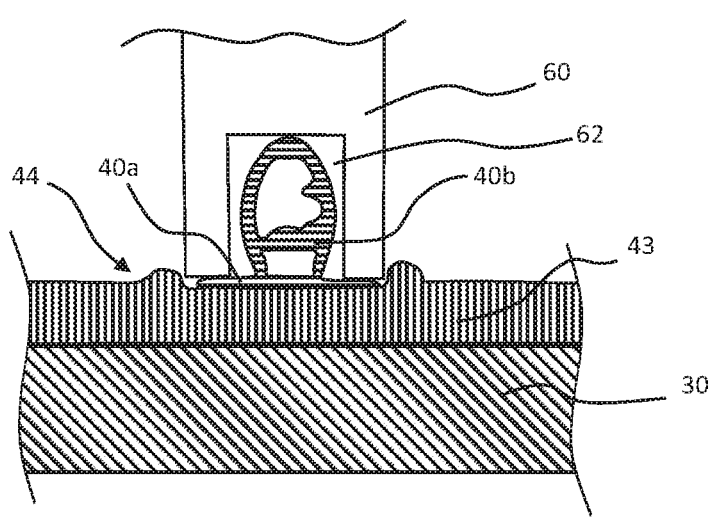
FIG. 4C shows a third embodiment of a method step of the method herein disclosed.

In an embodiment shown in FIG. 4C, the liquid sealant 43 is applied in a larger part of the interstice 41. Applying the liquid sealant 43 in a larger part may of course be used as well in the embodiment of FIGS. 3E and 4B. Similarly, only locally applying the liquid sealant 43 as used in the embodiments of FIGS. 3E and 4B may as well be used in the embodiment of FIG. 4C. Within the scope of the present invention, the liquid sealant should be applied at least to the extent that the interstice 41 is sealed below the seal 40 such that no liquid may pass through the interstice 41 below the seal 40.

Figure 4D:
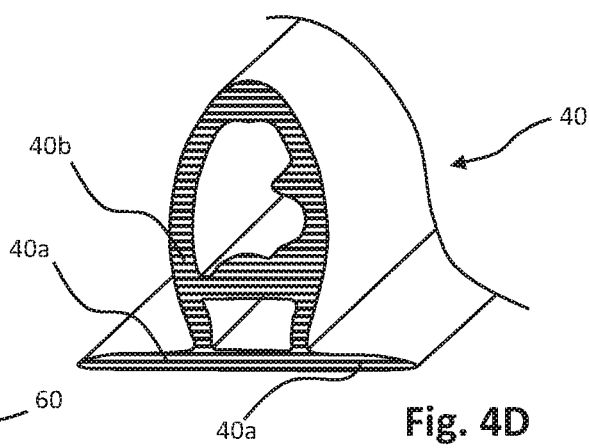
FIG. 4D shows an embodiment of a seal for use in the third embodiment of the method according to FIG. 4C.

Further, in the embodiment of FIG. 4C, the seal 40 is provided with a base part 40a and a main sealing part 40b, which is shown in more detail in FIG. 4D. With reference to FIGS. 4C and 4D, the base part 40a extends in a base plane, which after application of the seal 40 is substantially parallel to the frame and the sealant 43. The base part 40*a* comprises a first surface that, after application of the seal 40, is arranged on the frame and on the sealant 43. A second surface of the base part 40*a*, opposite to the first surface, is arranged adjacent to the main sealing part 40*b*. The main sealing part 40*b* extends perpendicular to the base plane and exhibits flexibility in this perpendicular direction such to be able to adapt to e.g. the closure member as illustrated in FIGS. 2C and 2D.

The roller 60 is adapted to the seal 40 having the base part 40*a*. In particular, the roller 60 is provided with the recess 62 to accommodate the main sealing part 40*b* during application of the seal 40, while the outer surface of the roller 60 contacts the second surface of the base part 40*a* such that the first surface of the base part 40*a* is pushed onto the fluid sealant 43, preferably to the extent that the seal 40 afterwards adheres to the sealant 43 and passes over the interstice 41 in a straight line.

Figure 4E:
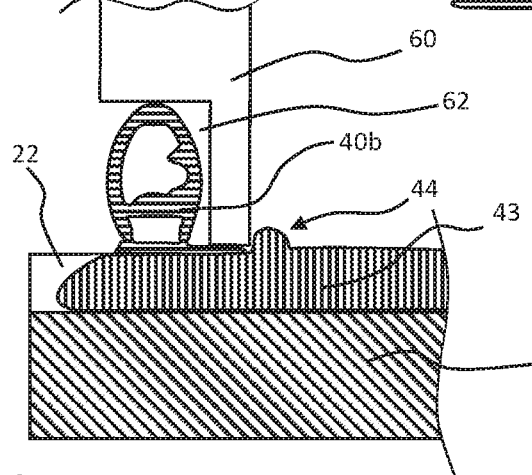
FIG. 4E shows a fourth embodiment of a method step of the method herein disclosed.

A fourth embodiment of the method as illustrated in FIG. 4E applies a seal 40, wherein the second surface of the base part 40*a* only extends on one side of the main sealing part 40*b* adjacent to the main sealing part 40*b*. This embodiment is suitable for applying the seal 40, if less surface area is available for the seal 40 or if insufficient space is available for the roller 60 to apply the seal 40.

Figure 5:
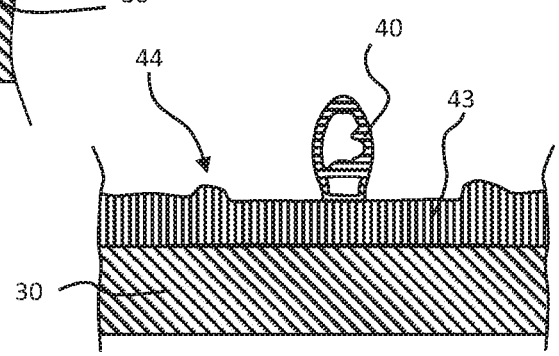
FIG. 5 shows a cross-sectional view of a second embodiment of the frame of the open roof assembly.

FIG. 5 shows a further embodiment where, as compared to the embodiment of FIG. 4B, the bulge 44 is arranged at a same location due to the use of a similar roller 60. However, the interstice 41 is now filled with the sealant 43 over its entire length. So, close to the sealing element 43 the sealant 43 is pushed flat and adjacent to the flat surface bulges 44 are present. Next to the bulges 44, the sealant 43 is present in an excess amount as it has been applied. In another embodiment, however, the liquid sealant may be applied over the length of the interstice 41 such that at the location of the sealing element 40 an excess amount is applied and at any other location less fluid sealant 43 is applied.

Figure 6:
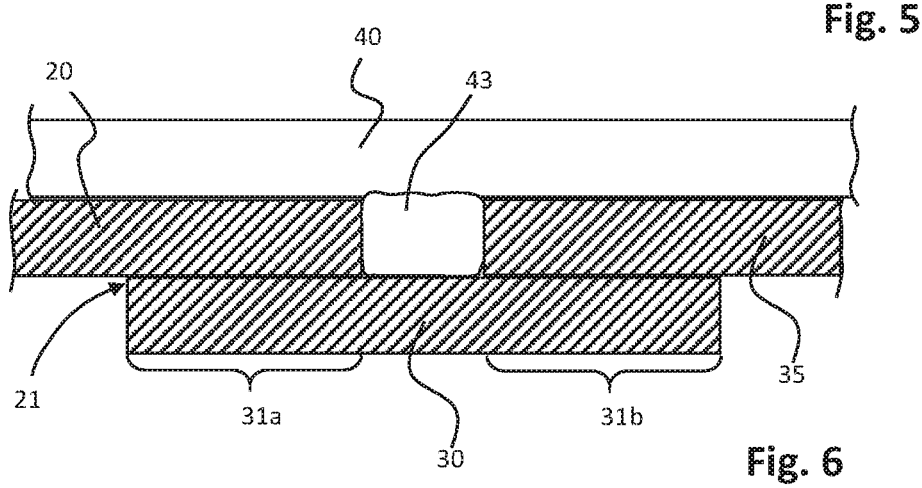
FIG. 6 shows a cross-sectional view of a third embodiment of the frame of the open roof assembly.

FIG. 6 shows another embodiment of a frame sealing. In the embodiment of FIG. 6, the first and the second frame parts 20, 30 are arranged over each other at their respective attachment areas 21, 31*a*. A further frame part 35 is arranged over a further attachment area 31*b* of the second frame part 30. An interstice between edges of the first frame part 20 and the third frame part 35 is filled with fluid sealant 43 and the sealing element 40 is arranged on the surface of the first frame part 20 and the third frame part 35 in accordance with the present invention.

Figure 7:
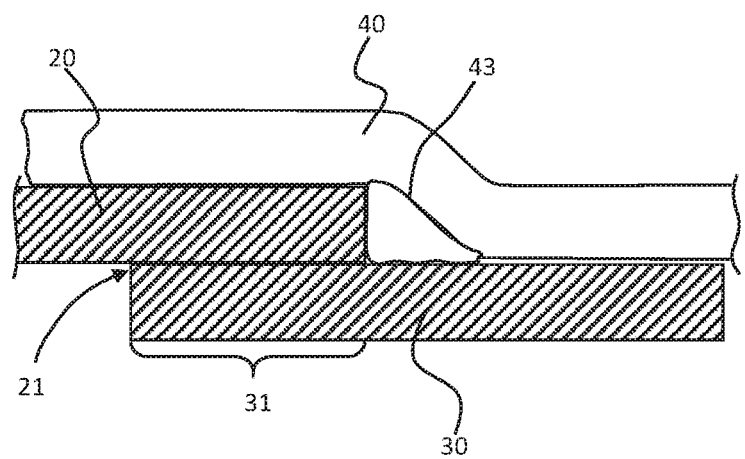
FIG. 7 shows a cross-sectional view of a fourth embodiment of the frame of the open roof assembly.

FIG. 7 illustrates yet another embodiment, wherein the respective surfaces of the frame parts 20, 30, on which the sealing element 40 is arranged, are not flush. The difference in level of these surfaces is bridged by the sealant 43. In particular, the fluid sealant 43 is provided on the surface of the second frame part 30 against the edge 22 of the first frame part 20. The sealing element 40 is then arranged over the fluid sealant 43 and pushed against the fluid sealant 43, shaping the fluid sealant 43 such that a fluid-tight connection is provided despite the height difference.

Figure 8A:
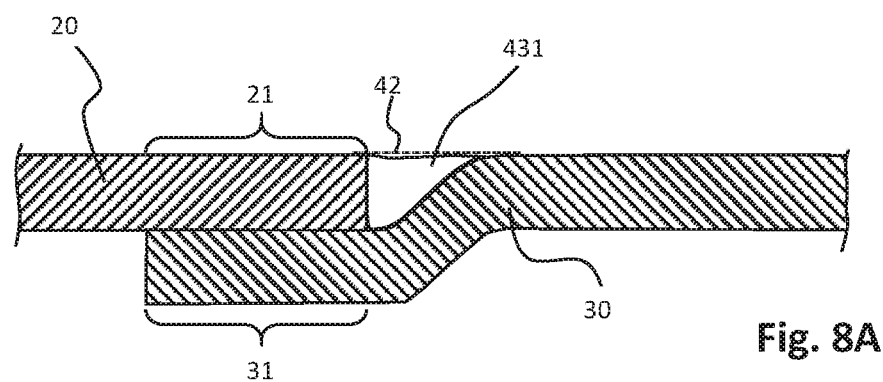
FIGS. 8A-8D illustrate another embodiment of the method.

FIGS. 8A-8D illustrate another embodiment of the method and in particular an embodiment of the above-described second step of the method. So, this embodiment starts with the first step as described above and as shown in FIGS. 3A and 3B. Then, in the second step and as shown in FIG. 8A, a first sealant 431 is applied in the volume 41. A level of the liquid first sealant 431 may be only slightly below the sealing level 42 and upto the sealing level 42. Preferably, the level of the first sealant 431 is not higher than the sealing level 42. For example, the liquid first sealant 431 is applied and then smoothened to a level equal to or lower than the sealing level 42. The first sealant 431 is then first cured or otherwise hardened.

Figure 8B:
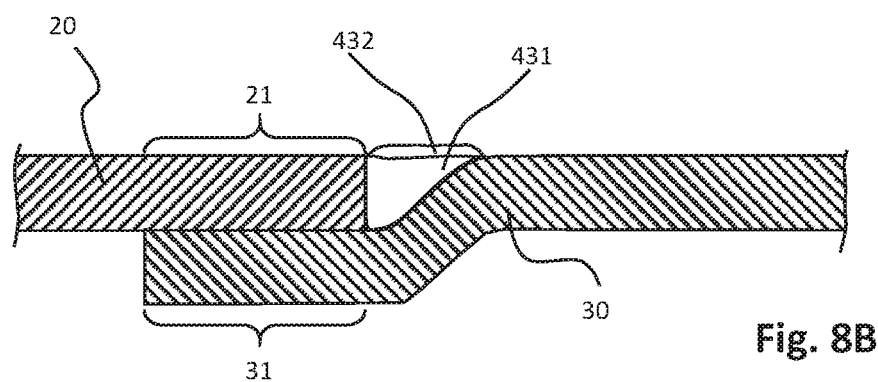

As shown in FIG. 8B, on top of the cured first sealant 431, a second sealant 432 is applied in a liquid state, wherein a level of the liquid second sealant 432 is higher than the sealing level 42. As the first sealant 431 is filled to a level close to the sealing level 42, only a small amount of second sealant 432 needs to be applied.

Figure 8C:
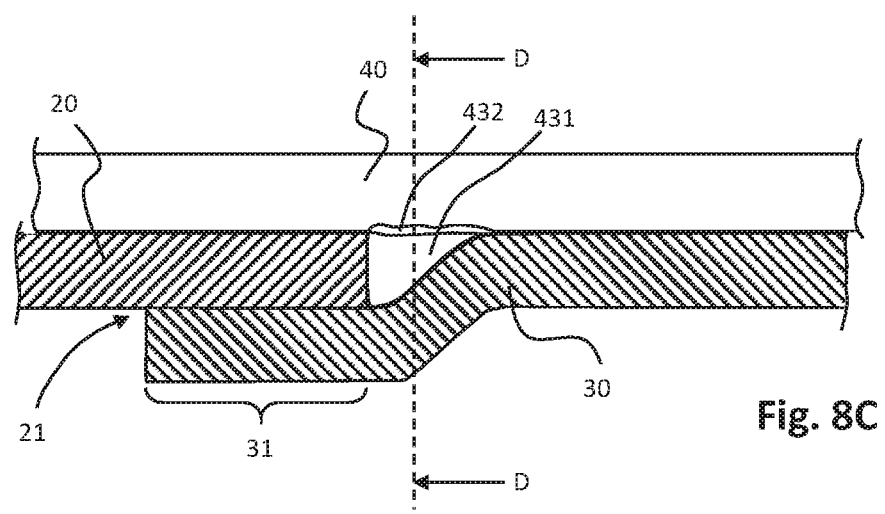

In the third step as shown in FIG. 8C, the sealing element 40 is arranged on the first frame part 20 and the second frame part 30 and over the liquid second sealant 432. In an embodiment, pressure may then be applied as above described. The second sealant 432 fills any volume between the sealing element 40 and the cured first sealant 431. As only little second sealant 432 is used and only a small height difference between the cured first sealant 431 and the sealing element 40 remains, the process of application may be better controlled such to prevent that the second sealant 432 adheres to a side face of the sealing element 40. Further, as the major part of the sealant is already cured and hardened, further manufacturing is less disturbed or dependent on the fluid (second) sealant.

Figure 8D:
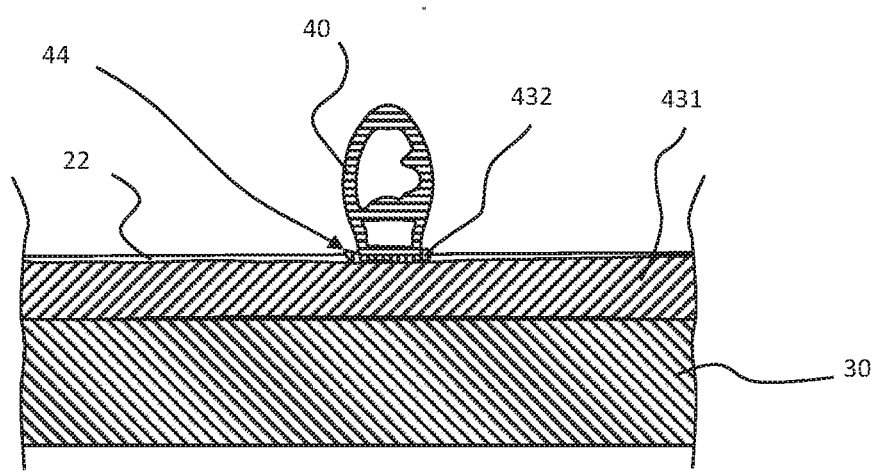

A cross-section of the result along the line D-D is shown in FIG. 8D. For illustrative purposes, the level of the first sealant 431 is drawn significantly below the sealing level, thereby showing a small part of the edge 22 of the first frame part 20. The second sealant 432 fills the gap between the sealing element 40 and the first sealant 431. For mechanical and positional stability of the sealing element 40, it may be preferred to provide sufficient fluid second sealant 432 to support the whole underside of the sealing element 40, due to which bulges 44 may result. However, this is not essential or required to obtain a fluid-tight connection.

Figure 9A:
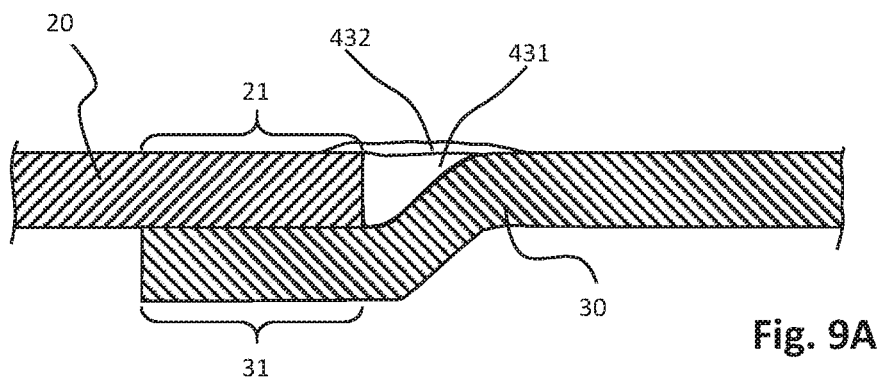
FIGS. 9A-9B illustrate yet another embodiment of the method.
Figure 9B:
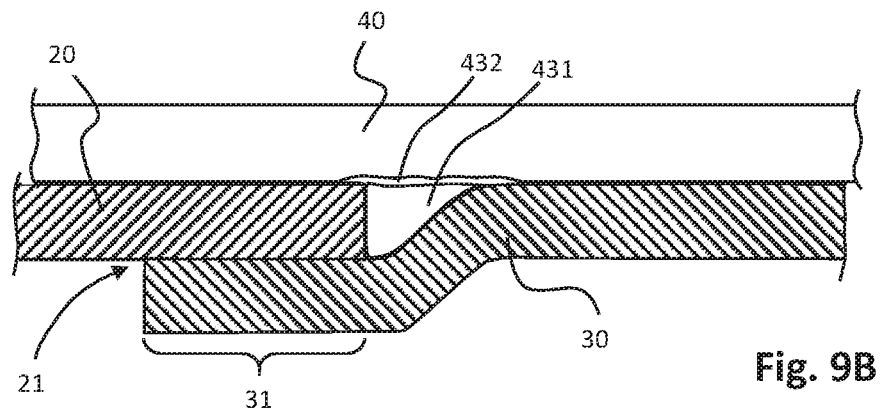

FIGS. 9A and B illustrate a further embodiment. While in the embodiment of FIG. 8A-D, the second sealant 432 is applied on the first sealant 431 only. In the embodiment of FIGS. 9A-9B, the liquid second sealant 432 may be applied not only on the first sealant 431, but also on the first frame part 20 and/or the second frame part 30.

Upon application of the sealing element 40, the second sealant 432 may be pressed sideways and only a very thin layer of second sealant 432 may remain between the frame parts 20, 30 and the sealing element 40 such that a transition to a part where there is no second sealant 432 between the sealing element 40 and the frame part 20, 30 has virtually no height difference and fluid-tightness is thus ensured.

Figure 10A:
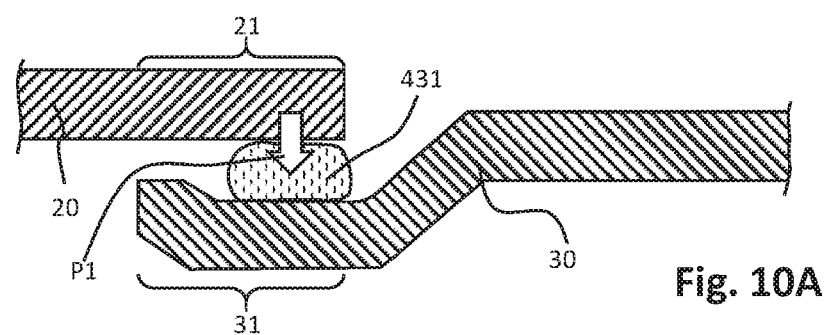
FIG. 10A-10B illustrate in a cross-sectional view another embodiment of the method and a fifth embodiment of the frame of the open roof assembly.
Figure 10B:
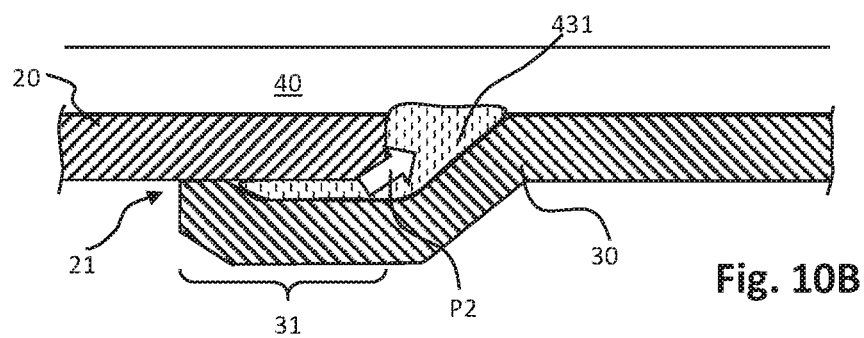

FIGS. 10A and 10B show another embodiment of the method and a fifth embodiment of the open roof assembly, wherein the method step of applying a fluid sealant adjacent to the edge of the first frame element may be performed prior to or at the same time of the step of arranging the first attachment area and the second attachment area at least partly over each other. As illustrated in FIG. 10A, an amount of first sealant 431 may be provided on the second frame element 30 in the second attachment area 31.

Then, the first attachment area 21 of the first frame element 20 is arranged on the first sealant 431. A volume of the amount of the first sealant 431 is however exceeding a volume available after arranging the first frame part 20 on the second frame element 30. As a result, the amount of first sealant 431 is pressed as indicated by arrow P1 (FIG. 10A) such that the first sealant 431 bulges upward as indicated by arrow P2 (FIG. 10B) and becomes arranged adjacent to the edge of the first frame element 20. Moreover, the amount of the first sealant 431 is selected such that the first sealant 431 bulges out of the space between the first and second frame elements 20, 30.

As illustrated in FIG. 10B, the seal element 40 is then applied over the at least partly fluid first sealant 431.

FIGS. 11A-11F show another embodiment of the method and a sixth embodiment of the open roof assembly, wherein an amount of sealant 431 is reduced as compared to the fifth embodiment.

Figure 11A:
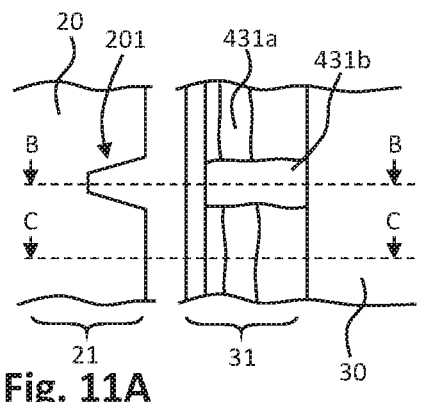
FIG. 11A-11F illustrate yet another embodiment of the method and a sixth embodiment of the frame of the open roof assembly.

FIG. 11A shows a top view of the first frame element 20 and the second frame element 30 in an unattached state. The first frame element 20 is provided with a notch 201 in the first attachment area 21. A first strip 431a of sealant is provided in the second attachment area 31 substantially parallel to the edge of the second frame element 30, as also illustrated in the cross-sectional view of FIG. 11C along line C-C. A second strip 431b of sealant is provided substantially perpendicular to said edge at a position corresponding to an intended position of the notch 201, as also illustrated in the cross-sectional view of FIG. 11B along line B-B. The amount of sealant of the second strip 431b is suitably selected to be more than a volume between the notch 201 and the second frame element 30 after attachment of the both frame elements 20, 30. Then, the amount of sealant from the first strip 431a and the second strip 431b fills the notch 201 and other space between the first frame element 20 and second frame element 30 adjacent to the notch 201. The excess amount of sealant is pressed to a level higher than a level of the surface of the first and second frame element 20, 30.

Figure 11D:
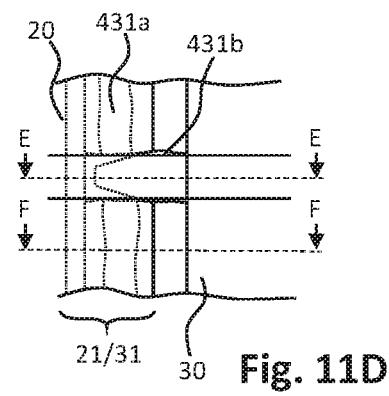
Figure 11B:
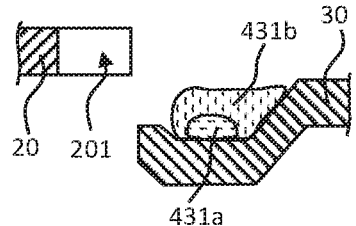

FIG. 11D shows a top view of the first and second frame elements 20, 30 after attachment and application of the seal element 40. Outlines of the sealant strips 431a, 431b and of the second frame element 30, which are—in this top view—below the first frame element 20 or below the seal element 40 are indicated by dotted lines. The first and the second attachment areas 21, 31 are arranged over each other and the first strip 431a of sealant is pressed such that a liquid-tight connection between the first and second frame elements 20, 30 is provided as shown in the cross-sectional view of FIG. 11F.

Figure 11E:
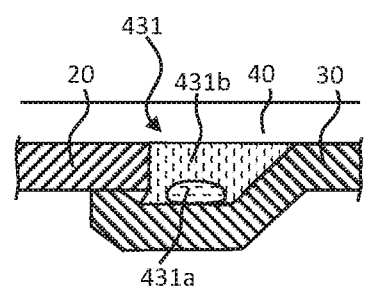
Figure 11C:
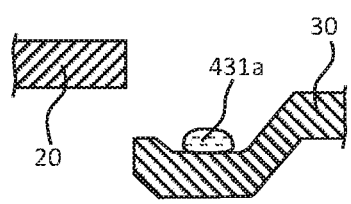
Figure 11F:
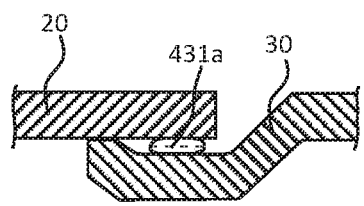

As illustrated in the cross-sectional view of FIG. 11E, the notch 201 is filled with sealant 431. The sealant 431 of the first strip 431a and the second strip 431b are pressed between the edge of the first frame element 20, including the edge of the notch 201, and the second frame element 30. The seal element 40 was arranged over the sealant 431, while the sealant 431 was still in a liquid state such that a liquid-tight crossing of the seal element 40 is obtained.

It is noted that in the fifth and sixth embodiment, a predetermined distance between the first attachment area 21 and the second attachment area 31 is provided for at least partially accommodating an amount of sealant 431. Further, in these embodiments, the space between the first attachment area 21 and the second attachment area 31 is closed by a ridge at the edge of the second attachment area 31. Both aspects provide for suitable control of the flow of the sealant 431 when the both frame elements 20, 30 are pushed together. These both aspects are therefore merely optional features and may be omitted depending on the requirements. Further, the sealant 431 may as well function as an adhesive, but within the scope of the present invention it is only required that the sealant 431 provides for a liquid-tight sealing. Other means may be applied for the mechanical coupling, as herein described.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A method of providing a frame for an open roof assembly, comprising:
   providing a first frame element having an edge and a first attachment area adjacent to the edge;
   providing a second frame element having a second attachment area;
   arranging the first attachment area and the second attachment area to at least partly overlap with the second attachment area below the first attachment area;
   applying a fluid sealant to contact the edge of the first frame element and contact a portion of the second attachment area adjacent the edge;
   applying a sealing element on at least one of the first frame element and the second frame element, and applying the sealing element on the fluid sealant, while the fluid sealant is still at least partly fluid; and
   curing the fluid sealant to provide a fluid-tight sealing between the sealing element and the at least one of the first frame element and the second frame element.

2. The method according to claim 1, wherein arranging the first attachment area and the second attachment area at least partly over each other comprises attaching the first frame element and the second frame element by at least one of welding, spot-welding, clinching, riveting, gluing and screwing.

3. The method according to claim 1, wherein the edge of the first frame element, a surface of the second frame element and the sealing element enclose a volume and wherein applying the fluid sealant comprises applying an amount of fluid sealant at the location of said volume, wherein the amount of fluid sealant exceeds said volume.

4. The method according to claim 1, wherein applying the sealing element comprises arranging the sealing element on at least one of the first frame element and the second frame element and on the fluid sealant and then applying pressure on the sealing element.

5. The method according to claim 4, wherein applying the sealing element comprises rolling a roller over the sealing element.

6. The method according to claim 5, wherein the sealing element comprises a base part in a base plane and a main sealing part extending in a direction perpendicular to the base plane, the base part comprising a first surface and a second surface opposite to the first surface, wherein in applying the sealing element the first surface of the base part is arranged on the fluid sealant and a surface of the roller rolls over the second surface of the base part to push the first surface of the base part on the fluid sealant.

7. A method of providing a frame for an open roof assembly, comprising:
providing a first frame element having an edge and a first attachment area adjacent to the edge;
providing a second frame element having a second attachment area;
arranging the first attachment area and the second attachment area to at least partly overlap with the second attachment area below the first attachment area;
applying and curing a fluid first sealant to contact the edge of the first frame element and contact the portion of the second attachment area adjacent the edge with an upper surface of the cured first sealant below a sealing level to create a void between the upper surface of the cured first sealant, the sealing level being a level where an underside of a sealing element is arranged;
applying a fluid second sealant on the cured first sealant to fill the void;
applying a sealing element on at least one of the first frame element and the second frame element, and applying the sealing element on the fluid second sealant, while the fluid second sealant is still at least partly fluid; and
curing the second sealant to provide a fluid-tight sealing between the sealing element and the at least one of the first frame element and the second frame element.

8. The method according to claim 7, wherein the fluid second sealant is applied on the cured first sealant and on at least one of the first frame part and the second frame part.

9. The method of claim 1 wherein the frame is for an open roof assembly for a roof of a vehicle, the first frame element and second frame element defining at least part of an opening in the roof of the vehicle for a closure member, wherein the closure member is moveable from a closed position, in which the opening is closed, to an open position.

10. A frame for an open roof assembly having an opening, the frame comprising:
a first frame element having an edge and a first attachment area adjacent to the edge;
a second frame element having a second attachment area, wherein the first attachment area and the second attachment area at least partly overlap with the second attachment area below the first attachment area, the first frame element and the second frame element defining at least part of the opening;
a partly fluid sealant contacting the edge of the first frame element and contacting a portion of the second attachment area adjacent the edge; and
a sealing element arranged on the first frame element, the partly fluid sealant and the second frame element, wherein the sealing element is in contact with the partly fluid sealant.

11. The frame according to claim 10, wherein an interstice is formed along the edge of the first frame element and the sealant is provided in the interstice, and wherein the sealant extends outside the interstice.

12. The frame according to claim 10, wherein the sealing element comprises a base part in a base plane and a main sealing part extending in a direction perpendicular to the base plane, the base part comprising a first surface and a second surface opposite to the first surface, wherein the first surface of the base part is arranged on the cured sealant.

13. The frame according to claim 11, wherein the cured sealant comprises a cured first sealant and a cured second sealant.

14. The frame according to claim 10 and further comprising a closure member configured to close the opening in a closed position, wherein in the closed position the closure member is in direct mechanical contact with the sealing element.

15. The frame according to claim 10, wherein the sealing element comprises a base part in a base plane and a main sealing part extending in a direction perpendicular to the base plane, the base part comprising a first surface and a second surface opposite to the first surface, wherein the first surface of the base part is arranged on the partly fluid sealant.

16. The frame according to claim 10 and further comprising a closure panel configured to close an opening in the roof in the closed position, wherein in the closed position the closure member is in direct mechanical contact with the sealing element for closing the opening in the roof.

17. The frame according to claim 10, wherein a bulge of the partly fluid sealant is present near an edge of the sealing element.

18. A frame for an open roof assembly made according to the method of claim 1.

19. A frame for an open roof assembly made according to the method of claim 8.

20. The frame according to claim 17, wherein a second bulge of the sealant is present near a second edge of the sealing element on a side opposite the edge.

* * * * *